(12) United States Patent
Kajikawa et al.

(10) Patent No.: US 9,683,650 B2
(45) Date of Patent: Jun. 20, 2017

(54) LUBRICATION STRUCTURE FOR REDUCTION GEAR

(71) Applicants: Atsushi Kajikawa, Hekinan (JP); Masaya Michishita, Okazaki (JP)

(72) Inventors: Atsushi Kajikawa, Hekinan (JP); Masaya Michishita, Okazaki (JP)

(73) Assignees: AISIN SEIKI KABUSHIKI KAISHA, Kariya-shi (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 185 days.

(21) Appl. No.: 14/410,857

(22) PCT Filed: Jul. 9, 2013

(86) PCT No.: PCT/JP2013/068743
§ 371 (c)(1),
(2) Date: Dec. 23, 2014

(87) PCT Pub. No.: WO2014/017290
PCT Pub. Date: Jan. 30, 2014

(65) Prior Publication Data
US 2015/0152954 A1    Jun. 4, 2015

(30) Foreign Application Priority Data

Jul. 24, 2012 (JP) ................................ 2012-163864

(51) Int. Cl.
*F16H 57/04* (2010.01)
*F16H 57/12* (2006.01)
*B60K 1/00* (2006.01)

(52) U.S. Cl.
CPC ......... *F16H 57/042* (2013.01); *F16H 57/045* (2013.01); *F16H 57/0424* (2013.01);
(Continued)

(58) Field of Classification Search
CPC ............... F16H 57/0427; F16H 57/045; F16H 57/0423; F16H 57/0434; F16H 57/0457; F16H 57/0494
See application file for complete search history.

(56) References Cited

U.S. PATENT DOCUMENTS 4,630,711 A * 12/1986 Levrai ................. F16H 57/0447
184/11.1
4,721,184 A * 1/1988 Sowards ............. F16H 57/0447
184/11.1
(Continued)

FOREIGN PATENT DOCUMENTS

EP    2 159 092 A2    3/2010
EP    2 159 092 A3    3/2010
(Continued)

OTHER PUBLICATIONS

Extended European Search Report issued Jun. 17, 2015 in Patent Application No. 13822446.4.
(Continued)

*Primary Examiner* — Ha D Ho
(74) *Attorney, Agent, or Firm* — Oblon, McClelland, Maier & Neustadt, L.L.P.

(57) ABSTRACT

A lubricating structure for a reduction gear includes a catch tank for holding a part of lubricating oil which is held on the bottom part of a transaxle case and which is supplied, by being scooped up, to each portion to be lubricated, a first oil passage provided within the transaxle case and guiding lubricating oil, which has been scooped up by a first driven gear, to the catch tank and a second oil passage provided within the transaxle case so as to be displaced from the first oil passage in an axial direction relative to the case and guiding lubricating oil, which has been scooped up by a second driven gear, to the catch tank.

6 Claims, 5 Drawing Sheets

(52) U.S. Cl.
CPC .... *F16H 57/0457* (2013.01); *B60K 2001/001* (2013.01); *F16H 57/0483* (2013.01); *F16H 2200/0021* (2013.01); *Y10T 74/19991* (2015.01)

(56) References Cited

U.S. PATENT DOCUMENTS

| | | | |
|---|---|---|---|
| 5,821,653 A | 10/1998 | Kinto et al. | |
| 6,864,607 B2 * | 3/2005 | Hashimoto | B60K 1/00 180/65.1 |
| 9,103,432 B2 * | 8/2015 | Isomura | F16H 57/0423 |
| 2004/0154846 A1 * | 8/2004 | Kira | B60K 6/405 180/65.6 |
| 2008/0128208 A1 | 6/2008 | Ideshio et al. | |
| 2010/0050800 A1 | 3/2010 | Michishita | |
| 2011/0192245 A1 * | 8/2011 | Shioiri | F16H 57/0423 74/467 |

FOREIGN PATENT DOCUMENTS

| | | |
|---|---|---|
| JP | 6 72168 | 3/1994 |
| JP | 9 226394 | 9/1997 |
| JP | 2005 278319 | 10/2005 |
| JP | 2007 32797 | 2/2007 |
| JP | 2009 127772 | 6/2009 |
| JP | 2010 223376 | 10/2010 |
| JP | 2011 137493 | 7/2011 |
| WO | WO 2007/013642 A1 | 2/2007 |

OTHER PUBLICATIONS

Japanese Office Action Issued May 13, 2014 in Application No. JP 2012-163864 Filed Jul. 24, 2012 (with English translation).
International Search Report Issued Oct. 15, 2013 in PCT/JP13/068743 Filed Jul. 9, 2013.

* cited by examiner

LUBRICATION STRUCTURE FOR REDUCTION GEAR

TECHNICAL FIELD

This invention relates to a lubrication structure for a reduction gear, and more particularly, relates to a lubrication structure for a reduction gear having a first pair of reduction gears which rotates with an output shaft of a drive source and a second pair of reduction gears which is arranged in a rotation shaft direction relative to the first pair of reduction gears, a rotation speed thereof being slower than a rotation speed of the first pair of reduction gear, both pairs of reduction gears being accommodated in a case, wherein a lubrication oil reserved on a bottom portion of the case is scooped up by the first and the second pairs of reduction gears and guided into a catch tank then supplied to a portion to be lubricated from the catch tank.

BACKGROUND ART

Conventionally, a lubrication structure is provided with first and second oil passage which are arranged to be overlapped with each other forming a double deck such that the first oil passage which guides the lubrication oil scooped up by the second pair of reduction gears into the catch tank is positioned lower than the position of the second oil passage which guides the lubrication oil scooped up by the first pair of reduction gears into the catch tank, due to the difference in scooping capacity of lubrication oil (capacity of scooping amount of oil) between the first and the second pairs of reduction gears, the second pair of reduction gears being inferior to the first pair of reduction gears. (See for example the Patent Document 1).

CITATION LIST

Patent Literature

Patent Document 1: JP2010-223376 A

SUMMARY OF INVENTION

Technical Problem(s)

However, as described above, since the first and second oil passage are arranged to be overlapped with each other forming a double deck such that the first oil passage which guides the lubrication oil scooped up by the second pair of reduction gears into the catch tank is positioned lower than the position of the second oil passage which guides the lubrication oil scooped up by the first pair of reduction gears into the catch tank, the size of the case in an up-down direction has to e large enough to accommodate the overlapped structure. This structure interferes with the installation of a spare tire or an on-board battery and is disadvantageous for assuring the space therefor.

Even when the catch tank per se is arranged in the case at an upper portion relative to the first and the second pairs of reduction gears, the size of the case in the up-down direction has to be large and it is, again, difficult for assuring the space for the spare tire or the on-board battery.

The present invention was made in consideration with the above drawbacks and an object of the invention is to provide a lubrication structure for a reduction gear having a first pair of reduction gears which rotates with an output shaft of a drive source and a second pair of reduction gears which is arranged in a rotation shaft direction relative to the first pair of reduction gears, a rotation speed thereof being slower than a rotation speed of the first pair of reduction gear, both pairs of reduction gears being accommodated in a case, wherein a lubrication oil reserved on a bottom portion of the case is scooped up by the first and the second pairs of reduction gears and guided into a catch tank then supplied to a portion to be lubricated from the catch tank, thus downsizing the case in an up-down direction.

Solution to Problem(s)

In order to solve the above problem, the lubrication structure for a reduction gear associated with an aspect of the invention is characterized in that the lubrication structure includes a first pair of reduction gears which rotates with an output shaft of a drive source and a second pair of reduction gears which is offset from the first pair of reduction gears in a rotation axis line direction, both the first and the second pairs of the reduction gears being accommodated in a case, the first pair of reduction gears being provided with a first driven gear and the second pair of reduction gears being provided with a second driven gear which rotation speed is slower than a rotation speed of the first driven gear, a catch tank accommodated in the case at positions to avoid overlapping in an up-down direction a catch tank accommodated in the case at positions to avoid overlapping in an up-down direction wherein the catch tank reserves a portion of lubrication oil in the case on a bottom portion thereof for supplying each portion to be lubricated with the scooped up lubrication oil, a first oil passage provided in the case and guiding the lubrication oil scooped up by the first driven gear to the catch tank and a second oil passage provided in the case offset from the first oil passage in a rotation axis line direction of the first pair of reduction gears and guiding the lubrication oil scooped up by the second driven gear to the catch tank.

DESCRIPTION OF EMBODIMENTS

The embodiment of the invention will be explained hereinafter with reference to the attached drawings. Some portions of the embodiment are omitted or modified and the size and shape of each portion are not necessarily precisely illustrated and the same reference numerals or symbols are referred to for the same parts or members.

Figure 1:
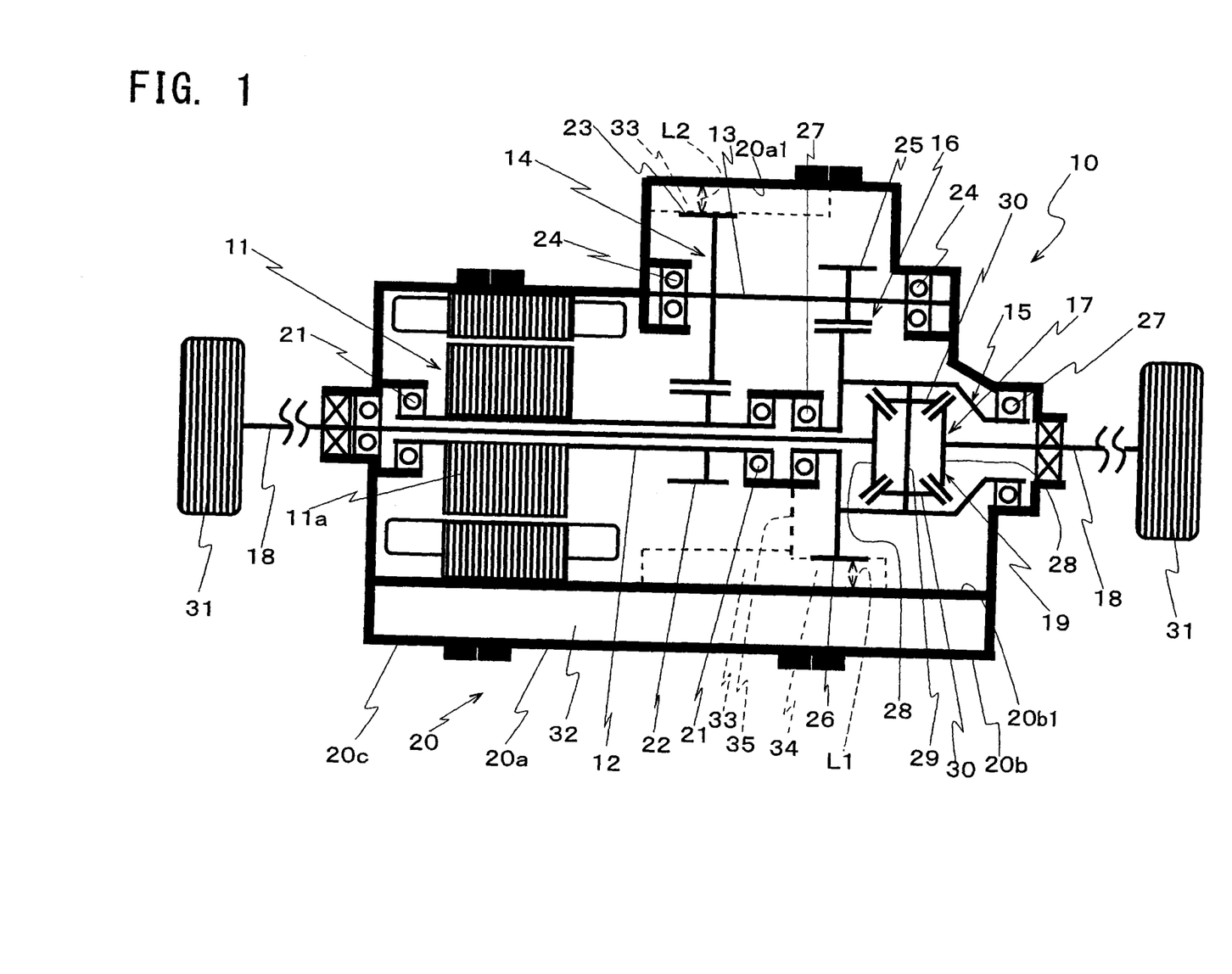
FIG. 1 is a skeleton view explaining the outline of the rear transaxle of a vehicle to which the invention is adapted.

FIG. 1 is a skeleton view of the structure of a rear transaxle 10 of an electrically operated four-wheel drive vehicle to which the invention is adapted. The rear transaxle 10 is an electric driving device for a two-axle type vehicle and is formed by an electric motor 11 as a drive source, a first pair of reduction gears 14 provided between an output shaft 12 of the electric motor 11 and a counter shaft 13 which is arranged in parallel with the output shaft 12, a second pair of reduction gears 16 provided between the counter shaft 13 and a differential case 15 arranged in parallel with the counter shaft 13 and concentrically arranged with the electric motor 11, a differential mechanism 17 provided inside of the differential case 15 and a differential gear device 19 rotatably driving a pair of rear axle shafts 18 by a torque transmitted from the electric motor 11 to the first and the second pairs of reduction gears 14 and 16, all of which are accommodated in a transaxle case 20 (corresponding to the case).

A rotor 11a of the electric motor 11 is connected to the central portion of the output shaft 12 and a pair of bearings (bearings for output shaft) 21 is installed at both ends of the output shaft 12. The output shaft 12 is rotatably supported on the transaxle case 20 via the pair of bearings 21.

The first pair of reduction gears 14 is formed by a counter drive gear 22 at the small diameter side and a counter driven gear 23 at the large diameter side (corresponding to the first driven gear). The counter drive gear 22 is integrally fixed to one end portion of the output shaft 12 at a tip end side thereof. Further, the counter driven gear 23 engages with the counter drive gear 22 and integrally fixed to one end of the counter shaft 13. The rotation axes for the first pair of reduction gears 14 correspond to the output shaft 12 and the counter shaft 13 which is arranged in parallel with the output shaft 12. Accordingly, the rotation axis line direction of the first pair of reduction gears 14 indicates the axial direction relative to the output shaft 12 or the counter shaft 13. In FIG. 1, the right-left direction corresponds to the rotation axis line direction of the first pair of reduction gears 14.

The counter shaft 13 is located at a vehicle front side further frontward relative to the output shaft 12 and the differential case 15, respectively provided in concentrically, counter drive gear 22 fixed thereto and a later explained final driven gear 26. Accordingly, the counter driven gear 23 is arranged at a most frontward in the transaxle case 20. A pair of bearings 24 (bearings for counter shaft) is disposed at both ends of the counter shaft 13 and the counter shaft 13 is rotatably supported on the transaxle case 20 via the pair of bearings 24.

The second pair of reduction gears 16 is arranged being offset along in a rotation axis line direction and is formed by a final drive gear 25 at the small diameter side and a final driven gear 26 at the large diameter side (corresponding to the second driven gear) as shown in FIG. 1. The final drive gear 25 is integrally fixed to the other end of the counter shaft 13. Further, the final driven gear 26 is arranged being offset from the counter drive gear 22 in the axis line direction of the output shaft 12. The final driven gear 26 engages with the final drive gear 25 and is fitted to an outer peripheral surface of the differential case 15 and integrally fixed thereto.

A pair of bearings 27 is fitted onto the outer peripheral surfaces of both end sides in an axial direction of the differential case 15. Thus, the differential case 15 and the final driven gear 26 integrally fixed to the differential case 15 are rotatably supported on the transaxle case 20 via the pair of bearings 27.

The differential mechanism 17 is a well-known so-called bevel gear wheel type gear mechanism. The bevel gear type differential mechanism 17 includes a pair of side gears 28 facing with each other on the rotation axis center in the differential case 15 and a pair of pinion gears 30 rotatably supported on a pinion shaft 29 provided between the pair of side gears 28 and fixed to the differential case 15 under the state perpendicular to the rotation axis center of the differential case 15 and engaging with the pair of side gears 28, respectively.

The pair of rear axle shafts 18 is integrally connected to the pair of side gears 28. A differential gear device 19 formed by the differential case 15 and the differential mechanism 17 rotatably drives the pair of rear axle shafts 18 by the torque transmitted from the electric motor 11 via the first and the second pairs of reduction gears 14 and 16, permitting a rotation speed differential between the pair of rear axle shafts 18. One of the pair of rear axle shafts 18 is connected to a left side wheel of a pair of rear vehicle wheels 31, penetrating through the output shaft 12 formed to be of a hollow cylindrical shape.

The transaxle case 20 is formed by a plurality of divided case portions divided into three parts in an axis center direction of the rear axle shafts 18. The plurality of divided case portions includes a cylindrical first divided case portion 20a which mainly accommodates the first pair of reduction gears 14, a cover shaped second divided case portion 20b which mainly accommodates the second pair of reduction gears 16 and a cover shaped third divided case portion 20c which mainly accommodates the electric motor 11, the three divided case portions being mutually tightened by means of bolts (not shown) for liquid-proof. The transaxle case 20 according to the embodiment is structured such that the first divided case portion 20a is arranged at the approximately central portion relative to the vehicle width direction, the second divided case portion 20b is connected to the first divided case portion 20a at a right side relative to the vehicle width direction and the third divided case portion 20c is connected to the first divided case portion 20a at a left side relative to the vehicle width direction, i.e., opposite side relative to the second divided case portion 20b to be formed as a three divided type case. These divided case portions are formed by a casting light-weight alloy, such as aluminum die-casting.

The counter driven gear 23 and the final driven gear 26 are rotated to scoop up the lubrication oil reserved in the transaxle case 20 on the bottom portion thereof. Thus the lubrication oil scooped up is supplied to the portions to be lubricated. According to the rear transaxle 10 of the embodiment of the invention adopts the oil scooping up type lubrication structure in which the lubrication oil reserved on the bottom portion of the transaxle case 20 is scooped up and supplied to the portions to be lubricated. The portions to be lubricated include for example, an engaging portion between the first and the second pairs of reduction gears 14 and 16, gear engaging portion and the rotation sliding portion of the differential mechanism 17 and each bearing portions 21, 24 and 27.

According to the transaxle case 20, a catch tank 32 is provided for reserving a portion of the lubrication oil which is scooped up in order to lower the oil surface level of the lubrication oil reserved on the bottom portion of the transaxle case 20 so that the stirring resistance by the counter driven gear 23 increased as the vehicle speed V increases can be reduced. As shown in FIGS. 2 through 5, the catch tank 32 is provided over the three divided case portions 20a through 20c so that the lubrication oil can be reserved to an oil level higher than the oil surface level reserved on the bottom portion of the transaxle case 20.

Figure 2:
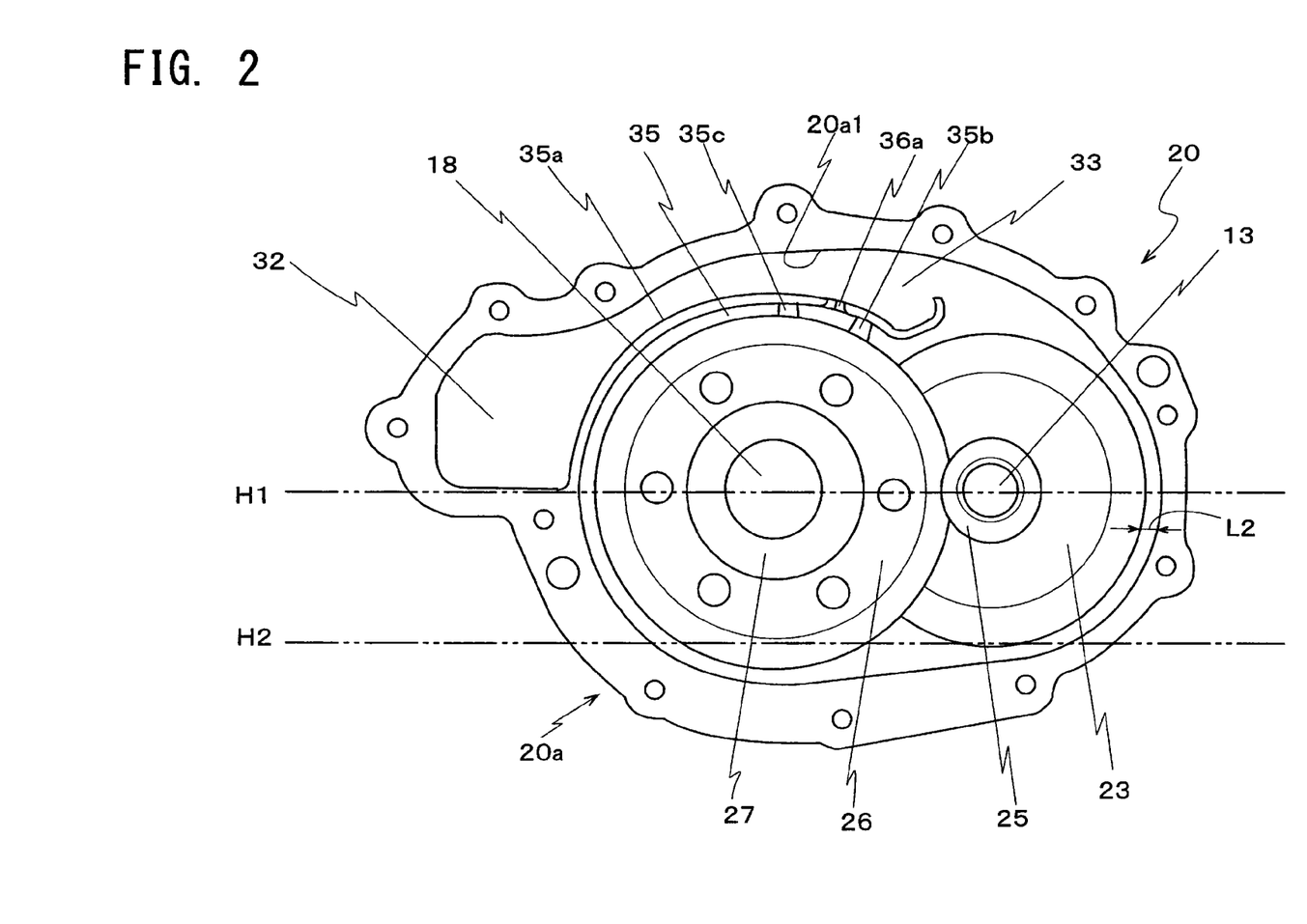
FIG. 2 is a front view showing an opening portion side of a first divided case portion of the transaxle associated with the embodiment of the invention.
Figure 3:
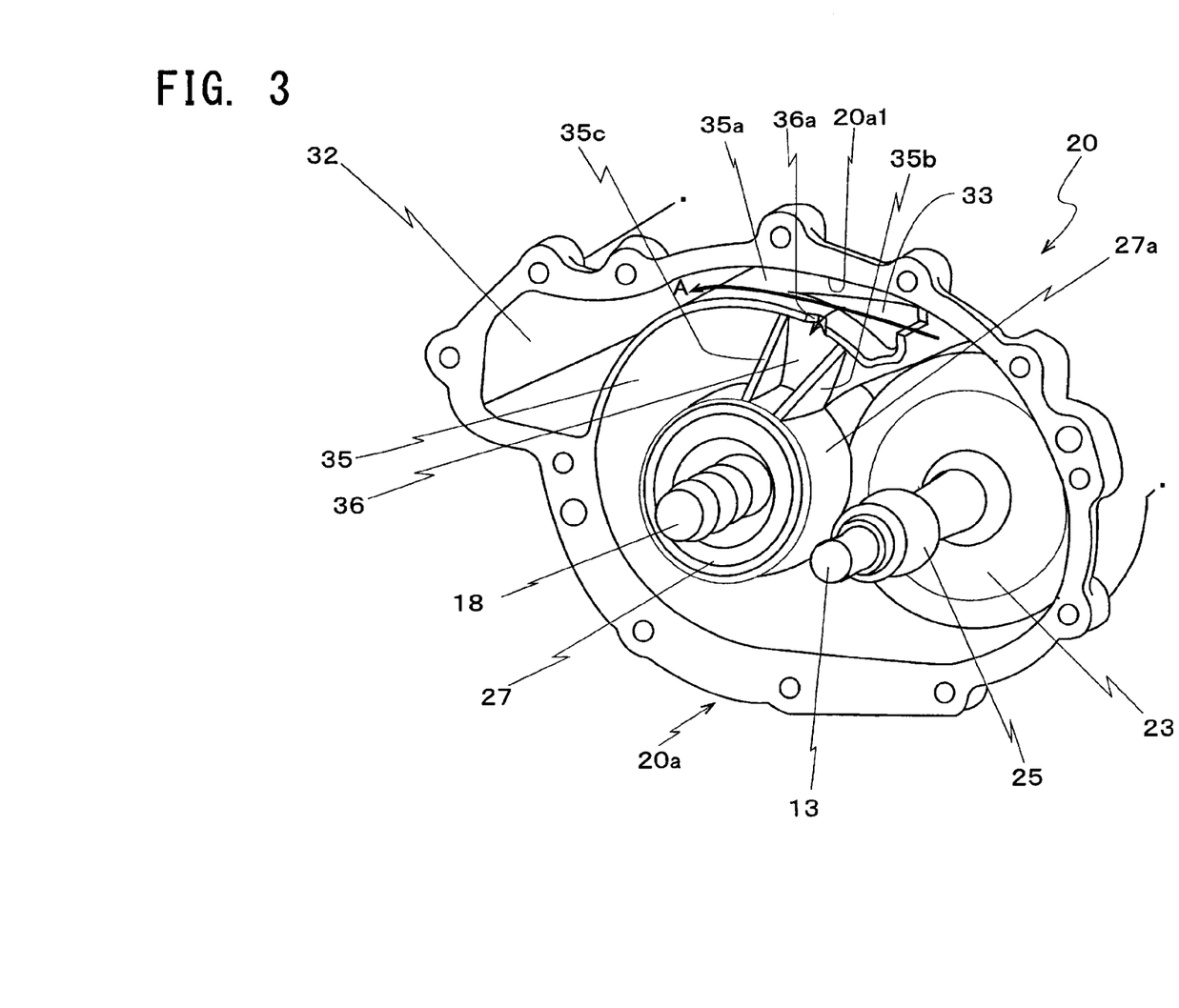
FIG. 3 is a partial perspective view of FIG. 2.
Figure 4:
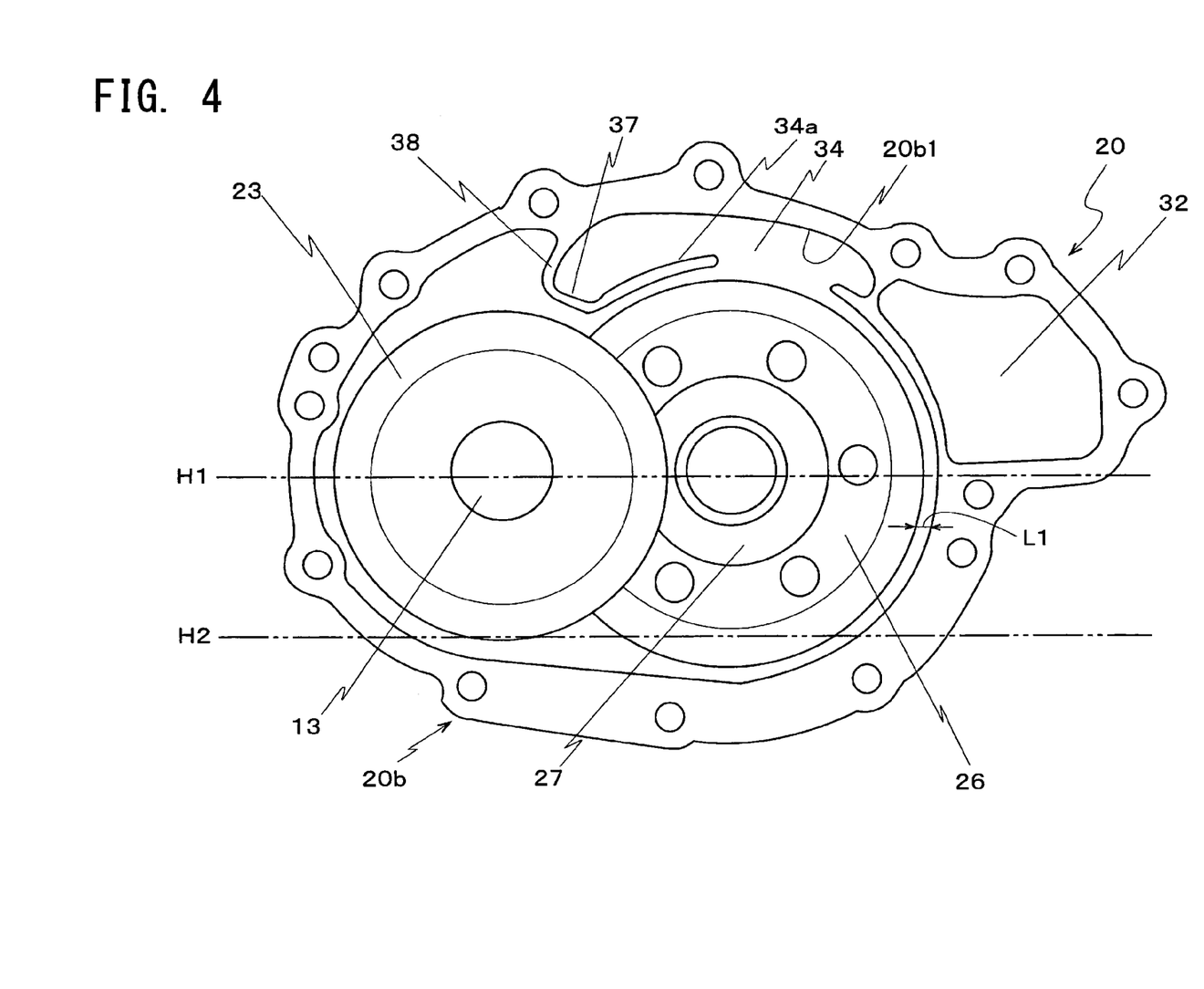
FIG. 4 is a front view indicating an opening portion side of a second divided case portion of the transaxle which is a mating surface of the opening portion side of the first divided case portion of the transaxle associated with the embodiment of the invention.
Figure 5:
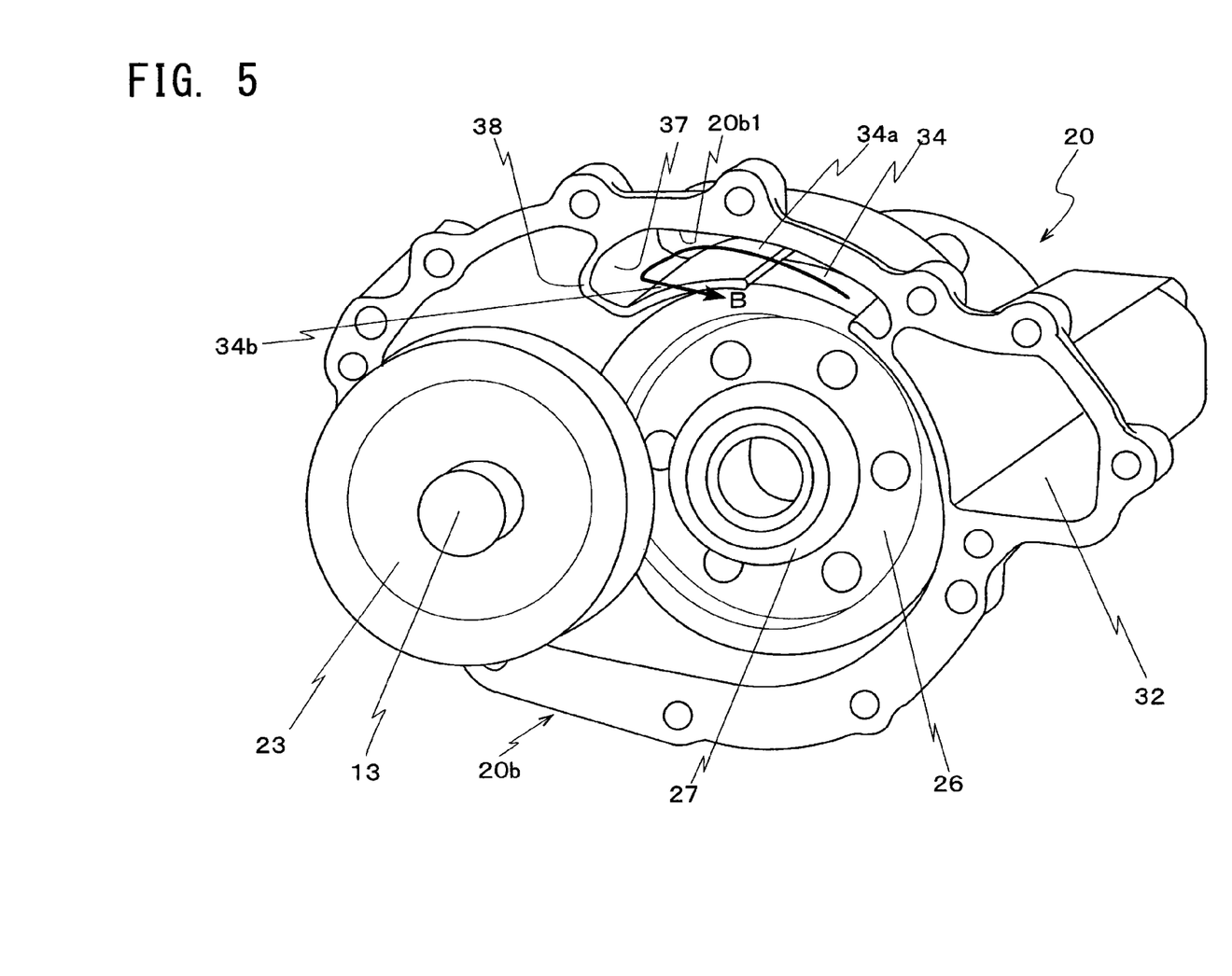
FIG. 5 is a partial perspective view of FIG. 4.

In order to secure a space for disposing a spare tire or an on-board battery at an upper space portion of the transaxle case 20, the catch tank 32 is arranged at the most rearward side of the transaxle case 20 as an example of the position which avoids the overlapping of the first and the second pairs of reduction gears 14 and 16 in an up-down direction (the most rearward side means the position at the rearward of the vehicle, further rearward, i.e., downward in FIG. 1, leftward in FIGS. 2 and 3 and rightward in FIGS. 4 and 5, than the first and the second pairs of reduction gears 14 and 16 including the counter shaft 13 in FIG. 1). In other words, a position for disposing the catch tank 32 is the area where the first and the second pairs of reduction gears 14 and 16 are not overlapped in a vertical direction and for example such area is defined by the area excluding the upper portion upper than the uppermost position in a height direction of the first and the second pairs of reduction gears 14 and 16, even the catch tank crosses over the upper portion of the first and the second pairs of reduction gears 14 and 16. Since most of the lubrication oil scooped up by the counter driven gear 23 of the first pair of reduction gears 14 are scattered upward or rearward as shown with the arrow A in FIG. 3, the catch tank 32 is arranged at the rearmost side of the transaxle case 20 which is the position where the scooped up lubrication oil can be effectively accommodated.

A smooth scooping up operation by the counter driven gear 23 can be achieved which rotation speed is faster than the rotation speed of the final driven gear 26 of the second pair of reduction gears 16 and superior in scooping up capability of the lubrication oil (scooping up oil mount is large). It is noted here that the lubrication oil reserved in the catch tank 32 is returned to the bottom portion of the transaxle case 20 by being supplied to another portion to be lubricated from a supply port (not shown) of the lubrication oil provided at the catch tank 32, or otherwise being flown over from the catch tank 32 when the lubrication oil is reserved to a predetermined level, or by supplying the portions necessary to be lubricated at the bearings or the oil seals to which any oil is not immersed with the naturally flowing out oil from a discharge port (not shown) provided at the bottom portion of the catch tank 32 due to the dropping of oil surface level on the bottom portion of the transaxle case 20.

The first divided case portion 20a of the transaxle case 20 is provided with a first oil passage 33 which guides the lubrication oil scooped up by the counter driven gear 23 of the first pair of reduction gears 14 to the catch tank 32 as shown with the arrow A in FIG. 3. On the other hand, the second divided case portion 20b of the transaxle case 20 is provided with a second oil passage 34 which guides the lubrication oil scooped up by the final driven gear 26 of the second pair of reduction gears 16 to the catch tank 32 as shown with the arrow B in FIG. 5. As shown in FIG. 1, the second oil passage 34 is offset from the first oil passage 33 in an axis line direction of the counter shaft 13 (to the right as viewed in FIG. 1) which is a rotation axis line of the counter driven gear 23 of the first pair of reduction gears 14. It is noted that the position of the second oil passage 34 is also the position offset from the first oil passage 33 in an axis line direction of the output shaft 12 (to the right as viewed in FIG. 1) which is a rotation axis of the counter drive gear 22 of the first pair of reduction gears 14. In other words, the second oil passage 34 is arranged being offset from the first oil passage 33 in a rotation axis direction of the first pair of reduction gears 14.

A wall portion 35 is provided inside of the first divided case portion 20a of the transaxle case 20 which supports the bearings 27 of the final driven gear 26 as shown in FIG. 2. The first oil passage 33 is formed on an outer peripheral surface 35a of the wall 35. In other words, the first oil passage 33 is defined by the outer peripheral surface 35a of the wall 35 and an outer peripheral wall 20a1 of the first divided case portion 20a and thus formed first oil passage 33 guides the lubrication oil scooped up by the counter driven gear 23 to the catch tank 32.

A supply passage 36 is formed on the wall portion 35 which establishes communication between the first oil passage 33 and the portions of the bearings to be lubricated and guides a portion of such lubrication oil flowing through the first passage 33 to the bearing 27. In more detail, the supply passage 36 is in communication with the first passage 33 through a communication bore 36a which penetrates the outer peripheral surface 35a of the wall 35. The wall portion 35 is divided into reinforcement rib portions 35ba and 35c provided at the wall portion 35 and reinforce a bearing supporting portion 27a of the bearing 27 thereby lubricating the portion to be lubricated at the bearing 27 by fluid communication therebetween.

Inside of the second divided case portion 20b of the transaxle case 20, as shown in FIGS. 4 and 5, a first guide passage 34a is formed at the second oil passage 34 for guiding the lubrication oil scooped up by the final driven gear 26 of the second pair of reduction gears 16 to a receiving portion 37 for receiving the scooped up lubrication oil. The first guide passage 34a extends in a direction opposite to the first oil passage 33. The second oil passage 34 is further provided with a second guide passage 34b which guides the lubrication oil scooped up by the final driven gear 26 to the first oil passage 33 from the receiving portion 37.

The first guide passage 34a is, as shown in FIGS. 4 and 5, formed at a tip end side of an intermediate wall 38 extending in an inner peripheral direction from an outer peripheral wall 20b1 of the second divided case portion 20b by being delimited by the intermediate wall 38 and the outer peripheral wall 20b1 of the second divided case portion 20b in a radial direction. The first guide passage 34a guides the lubrication oil scooped up by the final driven gear 26 to the receiving portion 37 positioned at the downstream side of the first guide passage 34a.

The second guide passage 34b is formed on the intermediate wall 38 in the upstream side (the receiving portion 37 side) and is formed to be merging with the first oil passage 33 in the downstream side. It is noted that the position of the communication bore 36a forming the supply passage 36 which connects the first oil passage 33 and the portion to be lubricated at the bearing 27 may be appropriately decided. The embodiment shown in FIGS. 2 and 3 indicates the communication bore 36a to be positioned at the first oil passage 33. The communication bore 36a may be provided at the merging position with the second guide passage 34b of the first oil passage 33 or somewhat downstream side from the merging position. According to the structure, the lubrication oil scooped up by the final driven gear 26 in addition to the lubrication oil scooped up by the counter driven gear 23 is guided to each portion to be lubricated of the bearing 27 through the second oil passage 34 (the first guide passage 34a), the receiving portion 37, the second guide passage 34b, the first oil passage 33, communication bore 36a and the supply passage 36.

As shown in FIGS. 2 and 4, the counter driven gear 23 of the first pair of reduction gears 14 and the final driven gear 26 of the second pair of reduction gears 16 are arranged at positions in a height direction so that at least approximately the lower halves thereof can be immersed in the lubrication oil reserved on the bottom portion of the transaxle case 20 under the vehicle being stopped. A two-dot chain line H1 shown in FIGS. 2 and 4 indicates the height level of the lubrication oil reserved in the transaxle case 20 at the bottom portion thereof, when the vehicle is stopped. Similarly, the rotor 11a of the electric motor 11 is arranged at a position in height direction so that at least approximately the lower half thereof can be immersed in the lubrication oil reserved on the bottom portion of the transaxle case 20 under the vehicle being stopped.

When the vehicle starts running, and as the vehicle speed V increases, the amount of lubrication oil scooped up from the transaxle case 20 increases thereby to gradually lower the height level H1. When the vehicle speed V is raised to approximately 50 Km/h, the height level H1 is lowered to a two dot chain line H2 shown in FIGS. 2 and 4. Under this state, even the lowest portion of the counter driven gear 23 of the first pair of reduction gears 14 is no more immersed in the oil. However, under this state, the lower end of the final driven gear 26 of the second pair of reduction gears 16 is still immersed in the lubrication oil.

Accordingly, after the vehicle speed V reached to 50 Km/h, it would be difficult to scoop up the lubrication oil in the transaxle case 20 by the counter driven gear 23 which scooping ability is superior to the final driven gear 26. However, the scooping of the oil from the transaxle case 20 can be maintained even thereafter, by the final driven gear 26. Although the rotation speed of the final driven gear 26 is slower than the rotation speed of the counter driven gear 23 in structural reasons, the rotation speed of the final driven gear 26 is raised under the vehicle being running with approximately 50 Km/h, scooping of the oil from the bottom of the transaxle case 20 can be performed by the final driven gear 26 only.

The rotation speed of the final driven gear 26 is slower than the rotation speed of the counter driven gear 23 and accordingly, the amount of scooping of oil from the case 20 is smaller than the amount of scooping by the counter driven gear 23. In order to improve the scooping ability for the final driven gear 26, as indicated in FIGS. 2 and 4, the length L1 of the radial gap between the large diameter portion of the final driven gear 26 and the outer peripheral wall 20b1 of the second divided case portion 20b is set to be smaller than the length L2 of the radial gap between the large diameter portion of the counter driven gear 23 and the outer peripheral wall 20a1 of the first divided case portion 20a (L1<L2).

As a wall portion for supporting the bearing which is to be lubricated, the wall portion 35 is shown as an example which supports the bearing 27 of the final driven gear 26 of the second pair of reduction gears 16 in this embodiment. However, it is not limited to this structure of the supporting wall and the wall for supporting the bearing 24 of the counter driven gear 23 of the first pair of reduction gears 14 or another wall for supporting another bearing correspond to the wall portion. It is also possible to form the second oil passage 34 on such walls other than the wall portion 35.

Further, it is possible to form the wall portion 35 to support the bearing 21 of the output shaft 12, thereby to guide the scooped up lubrication oil to the portion to be lubricated of the bearing 21 from the first oil passage 33 through the communication bore 36a and the supply passage 36. It may also possible to structure the oil supply route which supplies the lubrication oil from the first oil passage 33 to the bearing 21 of the output shaft 12 at the portion to be lubricated independently of the communication bore 36a and the supply passage 36.

As mentioned above, according to the rear transaxle (lubrication structure for reduction gear) 100 of the embodiment, it is possible to downsize the case 20 in an up-down direction by providing a structure which avoids overlapping of the first and the second oil passages 33 and 34, wherein the first oil passage 33 which guides the lubrication oil scooped up by the counter driven gear 23 which constitutes the first driven gear provided in the rear transaxle case 20 and the second oil passage 34 which guides the lubrication oil scooped up by the final driven gear 26 which constitutes the second driven gear also provided in the rear transaxle case 20 are offset from each other in an axial direction of the counter shaft 13 which is a rotation axis for the counter driven gear 23 of the first pair of reduction gears 14 so that the first oil passage 33 and the second oil passage 34 are not overlapped with each other in an up-down direction relative to the case 20.

As stated above, according to the rear transaxle (lubrication structure for reduction gear) 100 of the embodiment, it is possible to lubricate the portion to be lubricated of the bearing 27 by utilizing the wall portion 35 per se, because at least the first oil passage 33 is provided with the wall portion 35 which supports the bearing 27 of the final driven gear 26 which constitutes the second driven gear.

As stated above, according to the rear transaxle (lubrication structure for reduction gear) 100 of the embodiment, the second oil passage 34 includes the first guide passage 34a which guides the lubrication oil scooped up by the final driven gear 26 which constitutes the second driven gear to the receiving portion 37 which receives the scooped up lubrication oil and the second guide passage 34b extending in a direction different from the extending direction of the first guide passage 34a and guiding the lubrication oil from the receiving portion 37 to the first oil passage 33. According to this structure, even the direction of the guiding of the scooped up lubrication oil is different from each other between the first oil passage 33 and the first guide passage 34a of the second oil passage 34, both first and the second guide passages 34a and 34b can guide the scooped lubrication oil to the same catch tank 32 which eliminates the provision of catch tank at each of the first and the second oil passages 33 and 34. In different portions, thereby saving space.

As stated above, according to the rear transaxle (lubrication structure for reduction gear) 100 of the embodiment, it is possible to simplify the guiding structure for guiding the lubrication oil from the first oil passage 33 to the bearing 27 by providing the first oil passage 33 with the communication bore 36a on the wall portion 35, being in communication with the supply passage 36 which supplies the bearing 27 of the final driven gear 26 of the second driven gear with the lubrication oil.

As stated above, according to the rear transaxle (lubrication structure for reduction gear) 100 of the embodiment, it is possible to achieve both forming the supply passage 36 for lubricating the bearing 27 at the reinforcement rib portions 35b and 35c which are provided on the wall portion 35 by delimiting the supply passage 36 by the reinforcement rib portions 35b and 35c which reinforce the bearing supporting portion 27a provided on the wall portion 35 and which supports the bearing 27 and the reinforcement of the bearing supporting portion 27a.

As stated above, according to the rear transaxle (lubrication structure for reduction gear) 100 of the embodiment, the drive source is the electric motor 11, the first pair of reduction gears 14 is provided between the output shaft 12 of the electric motor 11 and the counter shaft 13 arranged in parallel with the output shaft 12, the second pair of reduction gears 16 is provided between the counter shaft 13 and the differential case 15 which is arranged in parallel with the counter shaft 13, and inside thereof being provided with a differential mechanism 17 for rotatably drive the pair of vehicle axles 18, wherein the scooping up the lubrication oil from the bottom of the case 20 and guiding the scooped up oil to the first oil passage 33 is carried out by the counter driven gear 23 which is the first driven gear fixed to the counter shaft 13 and provided at the large diameter side of the first pair of reduction gears 14, the scooping up the lubrication oil from the bottom of the case 20 and guiding the scooped up oil to the second oil passage 34 is carried out by the final driven gear 26 which is the second driven gear fixed to the differential case 15, and wherein the first oil passage is formed on the wall portion 35 which supports the bearing 27 of the final driven gear 26 which is the second driven gear. Thus, the lubrication structure for the reduction gear is adapted to a vehicle which has at least a pair of electrically driven vehicle axles 18.

Further, when a plurality of embodiments exists, it is apparently possible to combine features of each embodiment, unless otherwise stated.

According to one embodiment of the invention, the lubrication structure includes a first pair of reduction gears 14 which rotates with an output shaft 12 of a drive source and a second pair of reduction gears 16 which is displaced from the first pair of reduction gears 14 in a rotation axis line direction. Both of the first and the second pairs of the reduction gears are accommodated in a transaxle case 20, the first pair of reduction gears 14 being provided with a first driven gear 23 and the second pair of reduction gears 16 being provided with a second driven gear 26 which rotation speed is slower than a rotation speed of the first driven gear. The lubrication structure further includes a catch tank 32 disposed in the pair of reduction gears, both the first and the second pairs of reduction gears being accommodated in the transaxle case 20 at positions to avoid overlapping in an up-down direction wherein a portion of lubrication oil reserved therein on a bottom portion thereof is scooped up for supplying each portion to be lubricated such as bearing 27 with the scooped up lubrication oil, a first oil passage 33 provided in the transaxle case 20 and guiding the lubrication oil scooped up by the first driven gear to the catch tank and a second oil passage 34 provided in the transaxle case 20 displaced from the first oil passage in a rotation axis line direction of the first pair of reduction gears and guiding the lubrication oil scooped up by the second driven gear to the catch tank.

According to the lubrication structure of the above embodiment, the first oil passage 33 provided in the transaxle case 20 and guiding the lubrication oil scooped up by the first driven gear 23 to the catch tank 32 and the second oil passage 34 provided in the transaxle case 20 and guiding the lubrication oil scooped up by the second driven gear 26 to the catch tank are displaced in an up-down direction relative to the rotation axis line direction. Therefore, the downsizing of the transaxle case 20 in up-down direction can be achieved.

According to the lubrication structure of the embodiment, the second oil passage 34 is provided with a first guiding passage 34a for guiding the lubrication oil scooped up by the second driven gear 26 to a receiving portion 37 which receives the lubrication oil scooped up thereby and a second guiding passage 34b for guiding the lubrication oil which has been guided to the receiving portion 37 to the first oil passage 33. Accordingly, the scooped up lubrication oil from the first and the second oil passages 33 and 34 can be guided to the same catch tank 32 and there is no need to provide the first and the second oil passages separately from each other. This can save the space for installation.

According to the lubrication structure of the embodiment, the first oil passage 33 is provided with a communication bore 36a which is provided on the wall portion 35 and is in communication with a supply passage 36 for supplying the bearing 27 with the lubrication oil. Since the communication bore 36a is provided at the first oil passage 33 which is provided at the wall portion 35 and in communication with the supply passage 36 which supplies the bearing 27 with the lubrication oil, the structure of guiding the lubrication oil from the first oil passage 33 to the bearing 27 can be simplified.

According to the lubrication structure of the embodiment, the supply passage 36 is defined by a reinforcement rib portion 35b and 35c provided on the wall portion 35 and reinforcing a bearing supporting portion 27a which supports the bearing 27. Since the supply passage 36 is defined by the reinforcement rib portion 35b and 35c which reinforces the bearing supporting portion 27a which supports the bearing 27 provided at the wall portion, the forming of the supply passage 36 for lubricating the lubrication oil to the bearing at the reinforcement rib portion on the wall portion and the reinforcement of the bearing supporting portion can be both achieved.

According to the lubrication structure of the embodiment, the drive source is an electric motor 11, the first pair of reduction gears 14 is disposed between the output shaft 12 and a counter shaft 13 in parallel with the output shaft 12 and the second pair of reduction gears 16 is disposed between the counter shaft 13 and a differential case 15 which is arranged in parallel with the counter shaft 13 and having a differential mechanism 17 therein for rotatably driving a pair of axle shafts 18, wherein the first driven gear is a large diameter side driven gear of the first pair of reduction gears 14 which is a counter driven gear 23 fixed to the counter shaft 13 and the second driven gear is a final driven gear 26 fixed to the differential case 15, and wherein the bearing 27 serves as a bearing for the final driven gear. The structure of this embodiment can be adapted to a vehicle driven by electricity and having at least a pair of axle shafts.

11; electric motor (drive source)
12; output shaft
14; first pair of reduction gears
16; second pair of reduction gears
20; transaxle case (case)
33; first oil passage
34; second oil passage
35; wall portion
34a; first guide passage
34b; second guide passage
36; supply passage
36a; communication bore
37; receiving portion
27; bearing
27a; bearing supporting portion
35b, 35c; reinforcement rib portion
13; counter shaft
18; axle shaft
17; differential mechanism
15; differential case
23; counter driven gear (first driven gear)
26; final driven gear (second driven gear)

The invention claimed is:
1. A lubrication structure for a reduction gear comprising:
a first pair of reduction gears which rotates with an output shaft of a drive source and a second pair of reduction gears which is offset from the first pair of reduction gears in a rotation axis line direction thereof, both first and the second pairs of the reduction gears being accommodated in a case, the first pair of reduction gears being provided with a first driven gear and the second pair of reduction gears being provided with a second driven gear which rotation speed is slower than a rotation speed of the first driven gear;

a catch tank accommodated in the case at positions to avoid overlapping in an up-down direction, the catch tank reserves a portion of lubrication oil in the case on a bottom portion thereof scooped up for supplying each portion to be lubricated with a scooped up lubrication oil;

a first oil passage provided in the case and guiding the lubrication oil scooped up by the first driven gear to the catch tank; and a second oil passage provided in the case offset from the first oil passage in a rotation axis line direction of the first pair of reduction gears and guiding the lubrication oil scooped up by the second driven gear to the catch tank, wherein the second oil passage includes a receiving portion which receives the lubrication oil scooped up by the second driven gear and which guides the lubrication oil scooped up by the second driven gear to the first oil passage from the receiving portion in a direction different from a guiding direction of the lubrication oil scooped up by the second driven gear to the receiving portion.

2. The lubrication structure for a reduction gear according to claim 1, wherein the first oil passage is provided on a wall portion which supports a bearing.

3. The lubrication structure for a reduction gear according to claim 1, wherein the second oil passage is provided with a first guiding passage for guiding the lubrication oil scooped up by the second driven gear to the receiving portion which receives the lubrication oil scooped up thereby and a second guiding passage for guiding the lubrication oil which has been guided to the receiving portion to the first oil passage.

4. The lubrication structure for a reduction gear according to claim 2, wherein the first oil passage is provided with a communication bore which is provided on the wall portion and is in communication with a supply passage for supplying the bearing with the lubrication oil.

5. The lubrication structure for a reduction gear according to claim 4, wherein the supply passage is delimited by a reinforcement rib portion provided on the wall portion and reinforcing a bearing supporting portion which supports the bearing.

6. The lubrication structure for a reduction according to claim 2, wherein the drive source is an electric motor, the first pair of reduction gears is disposed between the output shaft and a counter shaft in parallel with the output shaft and the second pair of reduction gears is disposed between the counter shaft and a differential case in parallel with the counter shaft and having a differential mechanism therein for rotatably driving a pair of axle shafts, wherein the first driven gear is a large diameter side driven gear of the first pair of reduction gears which is a counter driven gear fixed to the counter shaft and the second driven gear is a final driven gear fixed to the differential case, and wherein the bearing serves as a bearing for the final driven gear.

* * * * *